(12) United States Patent
Tabatowski-Bush et al.

(10) Patent No.: US 9,302,595 B2
(45) Date of Patent: Apr. 5, 2016

(54) AUTONOMOUS CHARGE BALANCING CIRCUIT AND METHOD FOR BATTERY PACK

(71) Applicant: Ford Global Technologies, LLC, Dearborn, MI (US)

(72) Inventors: Benjamin A. Tabatowski-Bush, South Lyon, MI (US); Tuyen Quoc Tran, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 609 days.

(21) Appl. No.: 13/742,437

(22) Filed: Jan. 16, 2013

(65) Prior Publication Data

US 2014/0197682 A1    Jul. 17, 2014

(51) Int. Cl.

| | |
|---|---|
| *B60L 1/00* | (2006.01) |
| *B60L 3/00* | (2006.01) |
| *H02G 3/00* | (2006.01) |
| *B60L 11/18* | (2006.01) |
| *H02J 7/00* | (2006.01) |
| *B60R 16/03* | (2006.01) |
| *B60L 11/14* | (2006.01) |

(52) U.S. Cl.
CPC ......... *B60L 11/1851* (2013.01); *B60L 11/1866* (2013.01); *H02J 7/0016* (2013.01); *B60L 11/14* (2013.01); *B60R 16/0315* (2013.01); *Y02T 10/7005* (2013.01); *Y02T 10/7011* (2013.01); *Y02T 10/7055* (2013.01); *Y02T 10/7061* (2013.01)

(58) Field of Classification Search
CPC ... Y02T 10/7055; Y02T 10/7077; H02J 7/00; H02J 1/00; B60R 16/03; B60L 11/14

USPC .............. 307/9.1, 10.1, 10.2, 82, 66, 80; 320/136, 134, 112, 116

See application file for complete search history.

(56) References Cited

U.S. PATENT DOCUMENTS

| | | | |
|---|---|---|---|
| 8,130,000 B2 | 3/2012 | Botker et al. | |
| 2005/0007068 A1* | 1/2005 | Johnson | B25F 5/02 320/110 |
| 2008/0211459 A1* | 9/2008 | Choi | B60L 3/0046 320/134 |
| 2009/0015206 A1* | 1/2009 | Seman, Jr. | H02J 7/0019 320/134 |
| 2011/0080138 A1 | 4/2011 | Nakanishi | |
| 2011/0206948 A1 | 8/2011 | Asai et al. | |
| 2011/0210700 A1 | 9/2011 | Shimizu | |
| 2013/0200850 A1* | 8/2013 | Ke | H02J 7/0016 320/118 |
| 2013/0233072 A1* | 9/2013 | Milone | G01F 23/24 73/304 R |

* cited by examiner

*Primary Examiner* — Rexford Barnie
*Assistant Examiner* — Jagdeep Dhillon
(74) *Attorney, Agent, or Firm* — David Kelly; Brooks Kushman P.C.

(57) ABSTRACT

Systems and methods for controlling a vehicle having a traction battery with a plurality of cell groups each having a plurality of serially connected battery cells include balancing each cell of each cell group with a corresponding autonomous cell balancing circuit, and coupling a single output associated with each cell group to an associated battery monitoring circuit. An integrated driver and switch circuit adapts the voltage from an associated cell group for powering battery monitoring integrated circuits with a voltage range corresponding to a single cell voltage range to facilitate use of an existing battery monitoring integrated circuit design and subsequent input to a microprocessor-based battery controller. Cell balancing is performed at each cell with a battery monitor circuit associated with each group of cells.

15 Claims, 6 Drawing Sheets

AUTONOMOUS CHARGE BALANCING CIRCUIT AND METHOD FOR BATTERY PACK

TECHNICAL FIELD

The present invention relates to battery management for battery stacks using a cell balancing circuit.

BACKGROUND

Battery management of lithium ion battery packs for full hybrid, plug-in hybrid, and battery source vehicles using present systems typically uses a battery controller that monitors and balances each cell of the battery. This is very expensive and not consistent with the patterns of cost reduction utilized with other battery chemistries, such as nickel metal hydride (NiMH) batteries. As the control of prior chemistries progressed by development of control electronics monitoring multiple cells, it was possible to monitor every 8, every 10, every 12, or more cells. This has likely not been applied to batteries with lithium cells due to the relative intolerance to overcharges, and has generally demanded individual cell monitoring and control by the battery controller.

However, as the number of cells increases to meet larger battery energy requirements, the monitoring of individual cells, and the corresponding volume of outputs to the battery monitor IC's becomes too complex to practically, efficiently, and inexpensively incorporate in mass vehicle production. With a master controller coupled to dedicated monitoring IC's by serial peripheral interfaces (SPI) when lithium ion batteries may be selected to provide a high energy cell output, even slight overcharges in cell voltages generate cell changes that are very destructive to the cell structure and reduce battery life. Accordingly, attempts to use lithium-ion battery chemistry in mass production electrical vehicles has increased the difficulty of battery management.

SUMMARY

The present invention overcomes the above disadvantages by providing a decentralized battery controller with an autonomous cell balancing circuit across each cell of a cell group or brick that shunts the current around an overcharged cell and permits the cell to tolerate an overcharging event. As used in this description, decentralized refers to the separation of traditional battery controller functions from the battery controller components. Similarly, autonomous refers to the independence of a conventional battery controller function from other system controls.

A divider and switch circuit may be integrated with the cell-balancing circuitry, preferably on the same wafer for reduced packaging advantages. The divider and switch circuit is coupled across each cell group or brick from a stack of a plurality of bricks to provide a cell group voltage to each of a plurality of battery monitoring integrated circuits, in a manner that may conform with the methodology of satisfactorily controlling the cells without monitoring every cell to achieve production efficiencies. Preferably, individual cell balancing circuits associated with each cell are simple and inexpensive IC's to facilitate reduced architecture in the battery management controller.

Various embodiments according to the present disclosure provide associated advantages. For example, embodiments according to the present disclosure allow an arbitrary number of battery cells to be combined with a single output provided to a battery monitor integrated circuit while autonomously charge balancing each individual cell. The autonomous charge balancing circuits allow the balancing to be accomplished by taking the battery pack to a high State of Charge (SOC) similar to other chemistries such as Lead Acid or Nickel Metal Hydride, but permits balancing of lithium-ion cells individually even though a plurality of cells are connected in a group or brick and avoids overcharging that may damage a cell. In one embodiment, autonomous pure analog (APA) cell balancing is used rather than a master-slave relationship employed by previously known digital battery control systems The above advantages and various other advantages and features of the embodiments will be apparent to those of ordinary skill in the art based on the following detailed description of at least one exemplary embodiment as shown in the accompanying drawings.

BRIEF DESCRIPTION OF THE DRAWINGS

The present invention may be more clearly understood by reference to the following detailed description of a representative embodiment when read in conjunction with the accompanying drawings, in which like reference characters refer to like part throughout the views, and in which.

DETAILED DESCRIPTION

As required, details of embodiments of the present invention are disclosed. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
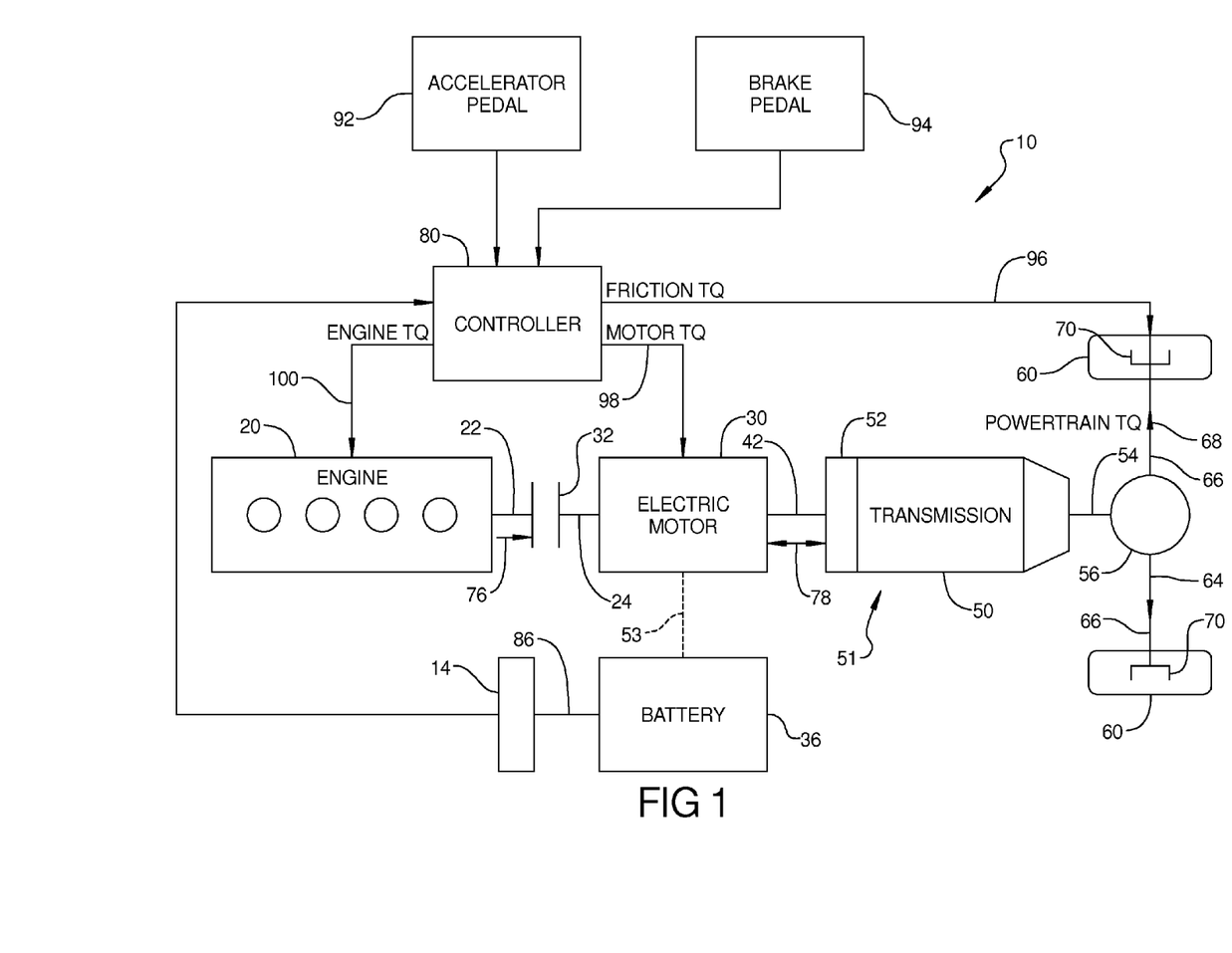
FIG. 1 is a diagrammatic view of a vehicle with an electrical system for powering a fraction motor, including a battery management system according to the present invention.

Referring to FIG. 1, a block diagram of an exemplary powertrain system 10 for a hybrid electric vehicle in accordance with an embodiment of the present invention is shown. Those of ordinary skill in the art will recognize that various features of the present disclosure may be applied to other powertrain configurations that include a traction battery used to power a traction motor, such as a plug-in hybrid vehicle or battery electric vehicle, for example. Likewise the present invention is generally independent of the particular powertrain configuration and couplings between the motor and/or battery and may include alternative powertrain configurations, such as a series, parallel, or combined series/parallel or powersplit configuration, for example. In the exemplary embodiment of FIG. 1, powertrain system 10 may include an engine 20, in addition to at least one electric machine such as an electric motor/generator 30 ("motor") and a traction battery 36, as well as a transmission 50, such as an automatic transmission 51 with a torque converter 52, for example.

Each of engine 20 and motor 30 may function as a drive source for the vehicle's powertrain 10. Engine 20 may be connectable in series to motor 30 through a disconnect clutch 32. Motor 30 is connected to the input side of transmission 51. For example, motor 30 may be connected to transmission 50 via a torque converter 52 between motor 30 and the input side of transmission 50. The input side of transmission 50 may be connected in series with both engine 20 and motor 30 when engine 20 is connected to motor 30 via disconnect clutch 32. On the output side, transmission 50 is connected through differential 56 to the drive wheels 60 of the vehicle.

The engine 20 may have an engine shaft 22 connectable to an input shaft 24 of motor 30 through disconnect clutch 32. Although disconnect clutch 32 is described and illustrated as a hydraulic clutch, other types of clutches may be used. Motor 30 has an output shaft 42 connected to the input side of transmission 50.

The transmission 50 may include multiple discrete gear ratios automatically selectable by a vehicle controller in response to vehicle operating conditions and a driving mode selected by the operator. The output side of transmission 50 includes an output shaft 54 that is connected to a differential 56. Drive wheels 60 are connected to differential 56 through respective axles 66. With this arrangement, transmission 50 transmits a powertrain output torque 68 to drive wheels 60. Alternatively, transmission 50 may be implemented by a continuously variable transmission (CVT) controlled by a vehicle and/or transmission controller to provide a desired output power or torque to drive wheels 60.

An engine 20 may be an internal combustion engine such as a gasoline, diesel, or natural gas powered engine, for example. Engine 20 generates an engine power having an engine torque 76 that is supplied to transmission 50 when engine 20 and motor 30 are connected via disconnect clutch 32. The engine power corresponds to the product of engine torque 76 and the engine speed of engine 20. To drive the vehicle with engine 20, at least a portion of engine torque 76 passes from engine 20 through disconnect clutch 32 to motor 30 and then from motor 30 to transmission 50.

The traction battery 36 is another source of power for powertrain system 10. Motor 30 is linked to battery 36 through wiring 53. Depending on the particular operating mode of the vehicle, motor 30 either converts electric energy stored in battery 36 into a motor power having a motor torque 78 or sends a corresponding amount of electrical power to battery 36 when operating as a generator. The motor power corresponds to the product of motor torque 78 and the motor speed of motor 30. To drive the vehicle with motor 20, motor torque 78 is transmitted from motor 30 to transmission 50. When generating electrical power for storage in battery 36, motor 30 obtains power either from engine 20 in a driving mode or from the inertia in the vehicle as motor 30 acts as a brake when operating in a regenerative braking mode.

As described, engine 20, disconnect clutch 32, motor 30, and transmission 50 are connectable sequentially in series as illustrated in FIG. 1. As such, powertrain system 10 may represent a modular hybrid transmission ("MHT") configuration in which engine 20 is connected to motor 30 by disconnect clutch 32 with motor 30 being connected to transmission 50. As previously described, various other drivetrain configurations may also utilize various features of the battery management system and method described herein.

The state or mode of disconnect clutch 32 being engaged or disengaged determines which input torques 76 and 78 are transferred to transmission 50. For example, if disconnect clutch 32 is disengaged, then only motor torque 78 is supplied to transmission 50. If disconnect clutch 32 is engaged/locked, then both engine torque 76 and motor torque 78 are supplied to transmission 50. Of course, if only engine torque 76 is desired for transmission 50, disconnect clutch 32 is engaged/locked, but motor 30 is not energized such that engine torque 76 is only supplied to transmission 50. Depending on the particular application and implementation, disconnect clutch 32 may be operated in a limited slip mode.

The transmission 51 may include clutches, bands, gears, and the like, and may also include one or more planetary gear sets to selectively effect different discrete gear ratios by selective engagement of friction elements to establish the torque flow paths and provide the corresponding desired multiple step-ratios. The friction elements are controllable through a shift schedule within controller 80 or a dedicated transmission controller that connects and disconnects certain elements of the planetary gear sets to control the ratio between the transmission input and the transmission output. Transmission 50 is automatically shifted by controller 80 from one ratio to another based on the needs of the vehicle as determined from driver demand and various other operating and ambient conditions. Transmission 51 then provides powertrain output torque 68 to output shaft 54 which ultimately powers drive wheels 60. The kinetic details of transmission 50 can be established by a wide range of transmission arrangements. Transmission 51 is only an example of a transmission arrangement for use with embodiments of the present invention. Any multiple ratio or variable ratio transmission that accepts input torque(s) from an engine and/or a motor and provides torque to an output shaft at the selected ratio is acceptable for use with embodiments of the present invention.

The powertrain system 10 further includes a vehicle system controller 80. Powertrain system 10 further includes an accelerator pedal 92 and a brake pedal 94. Accelerator pedal 92 and brake pedal 94 are in communication with controller 80. Various additional selectors, sensors, and actuators may also communicate with controller 80 for vehicle control depending on the particular application and implementation.

The driver of the vehicle depresses accelerator pedal 92 to propel the vehicle. In response, a total drive command based on the positioning of accelerator pedal 92 is provided to controller 80. Controller 80 apportions the total drive command between the engine power and the motor power to be provided to transmission 50 for propelling the vehicle. In particular, controller 80 apportions the total drive command between (i) an engine torque signal 100 (which represents the amount of engine torque 76 to be provided from engine 20, operating at a corresponding engine speed, to transmission 50 for propelling the vehicle) and (ii) a motor torque signal 98 (which represents the amount of motor torque 78 to be provided from motor 30, operating at a corresponding motor speed, to transmission 50 for propelling the vehicle). In turn, engine 20 generates the engine power having engine torque 76 and motor 30 generates the motor power having motor torque 78 for propelling the vehicle. Both engine torque 76 and motor torque 78 are supplied to transmission 50 when engine 20 is connected to motor 30 via disconnect clutch 32 such that the vehicle is propelled. Such engine torque 76 and motor torque 78 for propelling the vehicle are referred to herein as "positive" torques. Those of ordinary skill in the art will recognize that the positive/negative naming convention is used for ease of description only.

The driver of the vehicle depresses brake pedal 94 to slow or brake the vehicle. In response, a total brake command based on the positioning of brake pedal 94 is provided to controller 80. Controller 80 apportions the total brake command between (i) powertrain braking power to be provided by engine 20 and/or motor 30 to transmission 50 for braking the vehicle and (ii) friction braking power to be applied by friction brakes 70 to drive wheels 60 or other wheels for braking the vehicle. The powertrain braking power represents the amount of "negative" powertrain power to be provided by engine 20 and/or motor 30 to transmission 50 for braking the vehicle. Controller 80 apportions the powertrain braking power between (i) an engine torque signal 100 (which in this case represents the amount of negative engine torque 76 to be provided from engine 20, operating at a corresponding engine speed, to transmission 50 for braking the vehicle) and (ii) a motor torque signal 98 (which in this case represents the amount of negative motor torque 78 to be provided from motor 30, operating at a corresponding motor speed, to transmission 50 for braking the vehicle). In turn, engine 20 generates the engine power having negative engine torque 76 and motor 30 generates the motor power having negative motor torque 78 for braking the vehicle. Both engine torque 76 and motor torque 78 are supplied to transmission 50 when engine 20 is connected to motor 30 via disconnect clutch 32 to brake the vehicle. Controller 80 further generates a friction braking torque signal 96 (which represents the amount of torque to be obtained through friction brakes 70). In turn, friction brakes 70 apply the friction braking torque to drive wheels 60 or other wheels to brake the vehicle.

Figure 2:
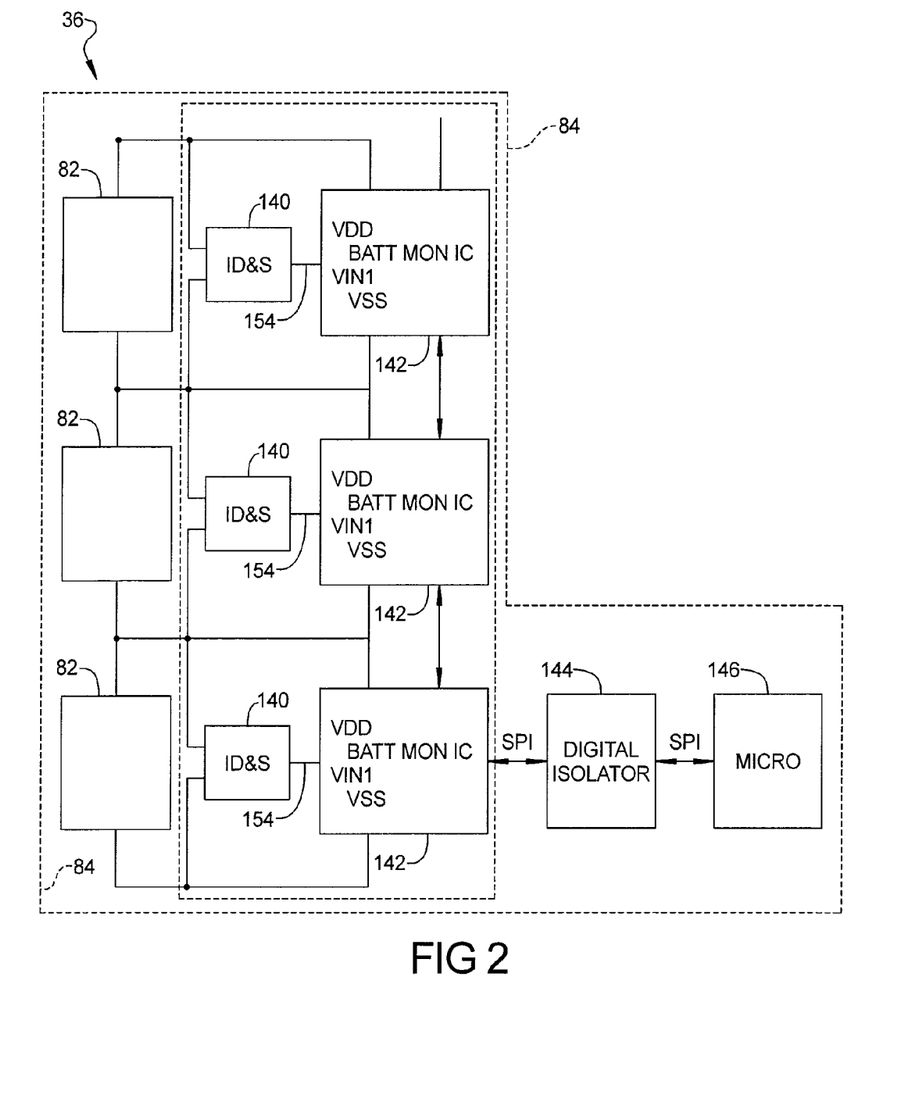
FIG. 2 is a diagrammatic view of the battery management system shown in FIG. 1.
Figure 3:
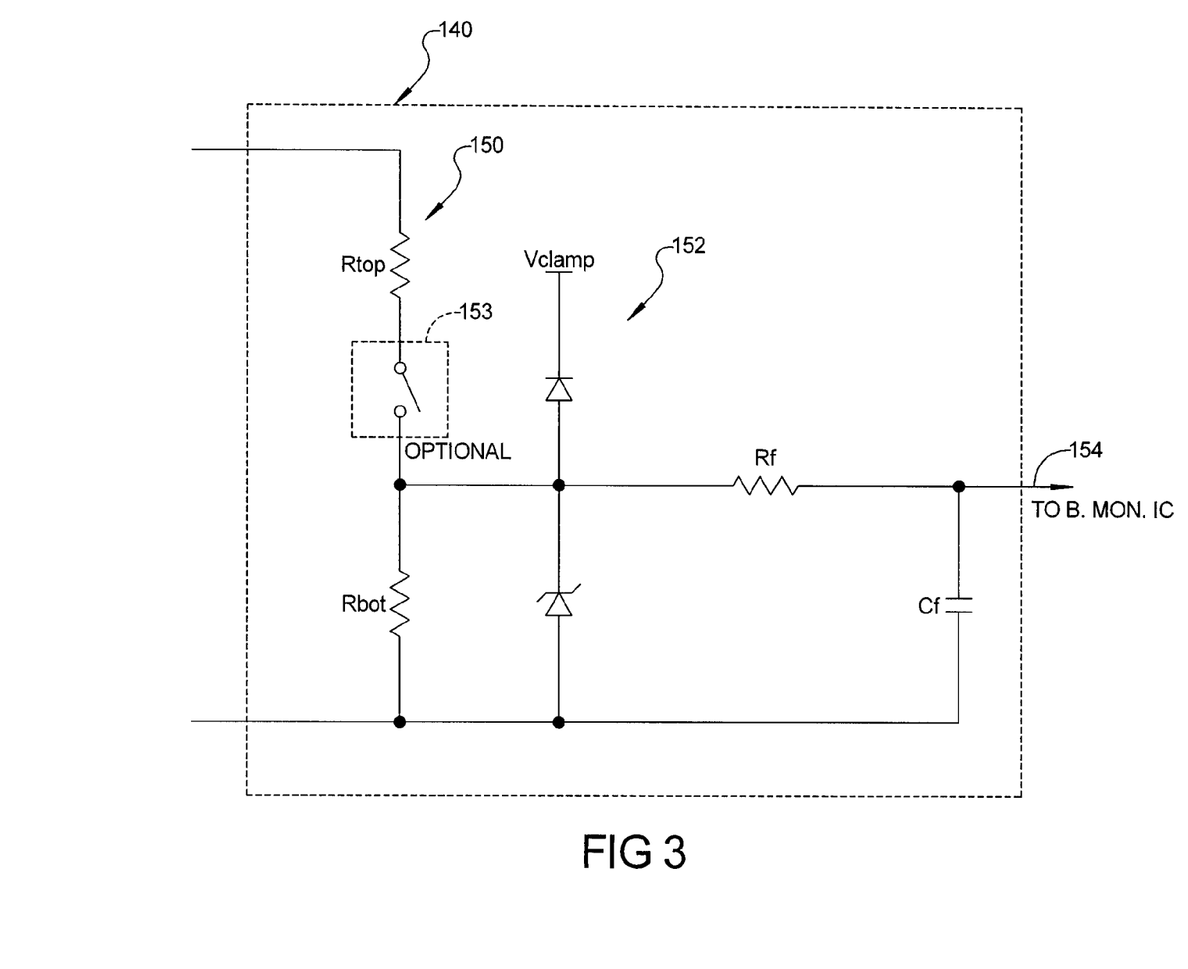
FIG. 3 is an electrical schematic view of an integrated divider and switch circuit used in the battery management system shown in FIG. 2.
Figure 4:
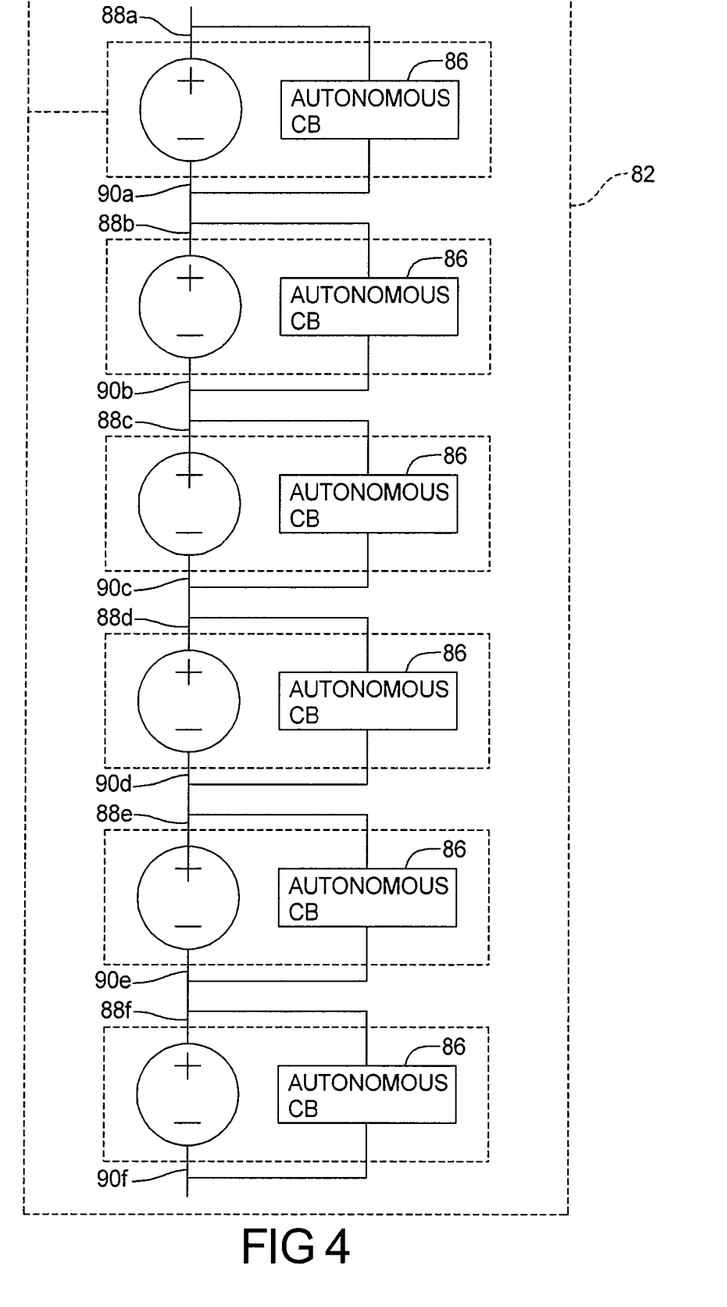
FIG. 4 is a detailed diagrammatic view of a multiple cell group used in the circuit of FIG. 2.

In the representative embodiment of FIG. 1, powertrain system 10 includes a battery 36 configured with stacks of a plurality of six-cell bricks 82 (FIG. 2). Each cell group or brick 82 may be coupled as a single unit with respect to a battery monitoring circuit, which may be implemented as an integrated circuit (IC). Regardless of the number of cells selected to define a group, each cell is provided with autonomous cell balancing electronics 86, which may also be implemented by an IC. Each brick 82 outputs voltage into a block or a one-port. Each six-cell group whose details are found in FIG. 3 has a charge balancing circuit 86 across each cell (FIG. 4). The cell balancing circuit 86 (FIG. 4) is electrically coupled across the terminals 88 and 90 (FIG. 4) of a single cell to form an autonomous cell balancing circuit that does not require an input for each cell to the battery monitoring circuit. A single output from each multiple-cell brick 82 may be presented to a corresponding battery monitor IC 142 (FIG. 2).

State-of-the-art battery monitoring circuits or controllers, circa 2011, were designed to monitor a single lithium ion battery cell and have a limited input voltage range of about 0-5 v. As such, the one-port voltage of a brick of cells arranged according to the present disclosure may be too high to use such battery monitoring circuits. In one embodiment according to the present disclosure, an integrated divider and switch (ID&S) circuit 140 is employed when the multiple cells of a brick 82 are to be coupled as a single input to an associated battery monitoring controller, for example, as shown in FIG. 3. This facilitates the use of existing state-of-the-art battery monitoring IC's, often providing six channels, for cell/brick configurations of multiple cells according to the present disclosure.

Referring to FIGS. 2-6, the cell balancing is handled inside the six-cell brick 82 autonomously by an analog circuit 86. The analog control 114 is better described in relation to the control functions shown in FIGS. 5 and 6. The control 114 increases the duty cycle on the MOSFET transistor 120 which drives a bleeder resistor 122. When a greater voltage on the cell is sensed, the MOSFET turns more fully on and the charge balancing capability is attained. So, to balance a cell, the battery pack is charged to a high state-of-charge (SOC) acceptable to the chemistry of the pack, until a cell voltage increases above this first threshold voltage. This allows an autonomous pure analog balancing action to counteract parasitic resistance loss of energy in a leakage path such as outgassing. Overcharging may have been avoided in previous battery controllers with a current interrupt device that would serve to shut off the brick to avoid overcharging.

Prior battery monitor IC solutions on the market have individual connections to each cell to monitor and balance the voltage of an associated cell. The present invention allows an arbitrary number of cells to be combined with a single output voltage provided to an associated battery monitor IC while autonomously charge balancing each individual cell. The autonomous charge balancing circuits 86 allow the balancing to be accomplished by taking the battery pack to a high State of Charge (SOC)—which is a methodology familiar to other chemistries such as Lead Acid or Nickel Metal Hydride, but permits individually balancing each of a plurality of lithium-ion cells configured in a brick to avoid overcharging that may damage a cell and, therefore, the brick's output. In one embodiment, autonomous pure analog (APA) cell balancing is used. As a result, the master-slave relationship of previously known digital battery control systems is not relied upon for cell-balancing.

The battery 36 comprises a series arrangement of cell groups or bricks 82 each having six lithium-ion battery cells connected in series to form the cell group or brick 82. The number of cells in the brick 82 may be varied as desired for control design with greater accuracy electronics allowing a greater number of cells. A plurality of bricks 82 may also be electrically coupled in series to form a stack 84. The plurality of bricks 82 may also be varied in number depending upon the size and power to be supplied by battery 36. The output of each brick 82 is then delivered through a divider and switch circuit 140 to a battery monitor integrated circuit (IC) 142. Voltage divider and switch circuit 140 is an interface circuit that adjusts the voltage from a cell group to an appropriate level for an associated battery monitor IC 142. In one embodiment, circuit 140 operates to adjust an input voltage provided by a group of cells 82 to an output voltage corresponding to a voltage associated with a single cell to facilitate use of a commercially available battery monitor IC 142 originally designed for use with individual battery cells. Each battery monitor IC 142 is coupled through a daisy chain for introducing a serial peripheral interface (SPI) link for connection to digital isolator 144. The isolated digital link is then introduced through the SPI bus to master microcontroller 146. However, the master controller 146 is no longer responsible for cell balance commands as in previous systems.

Figure 5:
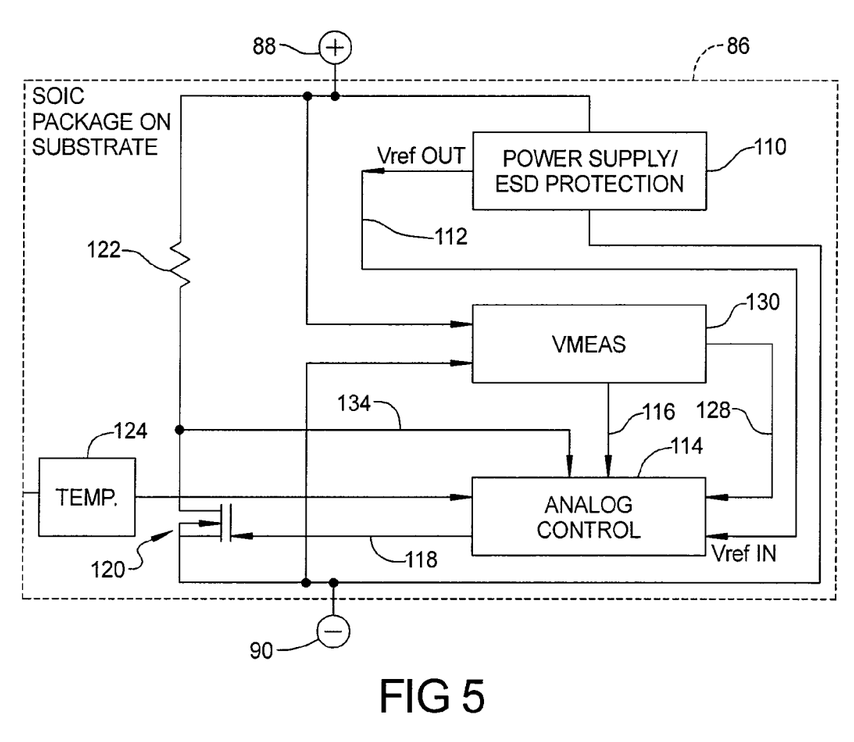
FIG. 5 is a diagrammatic view of the autonomous cell balancing circuit of FIG. 4.
Figure 6:
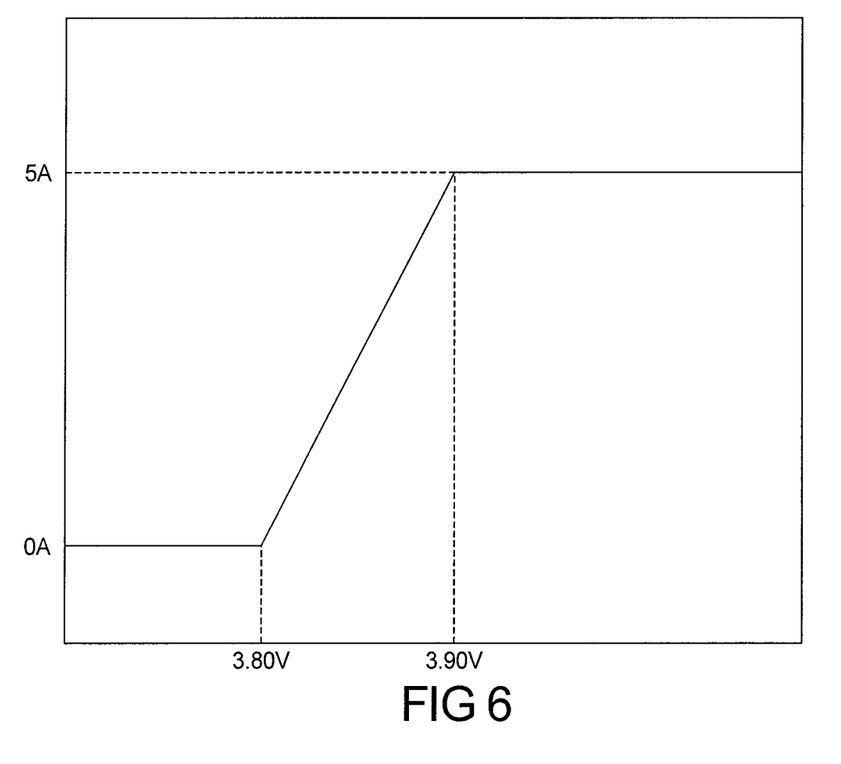
FIG. 6 is a graph showing an exemplary performance parameter of a cell balancing circuit constructed according to FIG. 5.

Referring now to FIGS. 4 and 5, a small outline integrated circuit (SOIC) package is used to provide autonomous cell balancing and accommodate varying voltages across the series of plates 88 *a, b, c, d, e, f,* and 90 *a, b, c, d, e, f* of the cells in cell group 82. The SOIC package functions as an analog closed-loop feedback controller that controls shunt current across an associated cell in response to a difference between measured cell voltage and a reference voltage. As such, the battery monitoring IC 142 can apply a higher voltage across a cell group 82 with each autonomous CB circuit 86 controlling the current/voltage provided to an associated cell to balance all cells in the cell group to a predetermined reference voltage.

As illustrated in FIG. 5, a power supply/ESD protection circuit 110 provides a voltage reference output 112 to an analog feedback control 114. In addition, the analog control 114 receives an input 116 of a measured or detected voltage across each set of the plates 88 and 90 associated with a corresponding cell. As the voltage difference between the reference voltage and the actual voltage across the plates 88 and 90 increases, the analog control 114 increases the duty cycle of the gate signal 118 feeding the MOSFET transistor 120 to enable a bleeder resistor to shunt the excess current before overcharge occurs.

The gate signal 118 may also be modulated with respect to temperature, for example, as shown in FIG. 5 by temperature measuring sensor 124. The analog control 114 may contain a timing function to tolerate short term voltage variances to avoid engaging the shunt current path. For example, the timing function may operate to mask or filter voltage variations lasting up to 10 seconds (±100 ms) to avoid engaging the shunt current path during a regeneration event. The SOIC provides a two-terminal device 86 on a substrate carried by a battery housing coupled to each cell. The autonomous analog control includes a filter or delay such that only voltages that exceed a trigger voltage, for example, 3.80 v for a selected time, for example, longer than 10 seconds (±100 ms), causes shunt current to flow, as generally illustrated in the representative transfer function illustrated in FIG. 6. In addition, when the cell voltage falls below 3.80V, the shunting current may fall below 10 uA within a short period, for example, 10 ms. The filter may also include a hysteresis limit (for example, 3.9 volts (±10 mv)). Likewise, the gate current 118 is varied by input 128 from voltage measurement 130 monitoring the voltages at each cell having a set of the cell plates 88 and 90. An input 134 to the control 114 monitors the current flowing through the bleeder resistor 122. When the cell voltage falls below the trigger or hysteresis limit, the shunting current between the two terminals falls below a current limit, for example 10 uA, within a limited time, for example, 10 ms. Otherwise, the cell balancing current flows through the shunt at a rate up to a protective limit, such as 5 A (±50 mA), for example. As a result, the autonomous cell balancing circuit 86 on each cell avoids overcharge that can occur as voltages produced across the cells vary within each brick 82.

The combination of the ID&S 140 and the battery monitor IC 142 allows the brick (e.g., 6-cell) voltages to be read and provided as a single input from the Battery Controller through the Digital Isolator 144 via a serial peripheral interface (SPI)-link, for example, an FO8 MICRO, such as a Freescale Star 8, and to the microcontroller 146, for example, a Freescale EYSYS, which then communicates through a controller area networking (CAN) bus to the rest of the vehicle. Alternatively, other embodiments of battery monitor IC's 142 may be single channel or custom chips that need not receive multiple channel inputs.

The divide and switch circuit 140 in the illustrated embodiment divides the sum of the multiple cell voltages through a divide-by-the-number of cells circuit to create a voltage in the range of inputs acceptable to the selected battery monitor IC's 142. For example, a 5 volts input may have been acceptable in an existing platform, without repopulating an existing controller configuration.

FIG. 4 illustrates a six-cell brick 82 wherein each cell is connected in series. Each cell may have its own autonomous charge balancing (CB) circuit 86 across the cell terminals 88 and 90. The autonomous CB circuit 86 responds on an individual cell level when a cell voltage exceeds a certain set voltage, for example. In contrast, previous battery controller technology employed a protector, such as a current interrupt device, that would serve to shut off the entire brick to avoid over-charging.

In the embodiment illustrated in FIG. 4, each cell of the brick 82 includes an autonomous cell balancing circuit in the form an integrated circuit package. As shown in greater detail in FIG. 5, a small outline integrated circuit (SOIC) package on a substrate may be secured across each cell to form an electrical coupling across the plates 88 and 90 as is schematically represented in FIG. 3.

Referring again to FIG. 3, the illustrated embodiment of the integrated divider and switch circuit 140 includes a voltage divider 150 whose output is delivered through a voltage clamp 152 to provide an output 154. The switch 153 is closed only at the times when cell voltages are measured by a microcontroller 146 and is open at all other times. Switch 153 is optional, and may be eliminated, for example, if the resistance of Rtop and Rbottom is so large that current draw is negligible.

A method for controlling battery stacks in a hybrid or electric vehicle with the apparatus described may include cell balancing each cell of a plurality of cells configured in a brick with an autonomous analog control circuit, and monitoring the output of at least one brick by introducing a voltage output to a battery monitoring controller. The method embodiments may also couple bricks in a series to form a stack that introduces a single output to an integrated circuit. The battery monitoring controller may include a plurality of integrated circuits.

As previously incorporated in production systems, each of the plurality of integrated circuits may receive a single output in each channel from a serially coupled set of the bricks to those circuits to a receiving channel. The output of a serially coupled set may be coupled to an integrated divider and switch circuit reduce the input voltage applied to a battery monitor IC.

The present invention also provides a battery power source and controller with a reduced footprint for a hybrid vehicle having a battery formed from a plurality of cells, each of a selected number of cells coupled in series and forming a brick; an autonomous analog cell balancing circuit electrically secured across each cell, and a plurality of said cells forming an output to at least one battery monitoring integrated circuit. The output of a plurality of serially connected cells may be coupled through an integrated divider and switch circuit, and so that the output of each brick is coupled to at least one channel of a battery monitor IC of the type previously employed to form a battery monitoring controller.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a traction battery having a plurality of cell groups each having a plurality of serially connected cells, comprising:
   balancing each of the cells with a corresponding autonomous cell balancing circuit by, as a difference between a reference voltage and a detected voltage across the cell increases, increasing via analog circuitry a duty cycle of a transistor gate signal to enable a resistor to shunt excess current before overcharge occurs.

2. The method as described in claim 1, comprising:
   coupling a plurality of the cell groups in series to form a stack; and
   coupling a single output from each of the stacks to a battery controller.

3. The method as described in claim 2, wherein the battery controller comprises a microprocessor.

4. The method as described in claim 1 further comprising:
coupling a voltage divider circuit to each of the cell groups and coupling a single output associated with each of the cell groups to an associated battery monitoring circuit, wherein each of the single outputs comprises an output from one of the voltage divider circuits.

5. The method as described in claim 4, wherein each of the cell balancing circuits and an associated one of the voltage divider circuits are formed on a single substrate.

6. A system for a plurality of battery cell groups each having a plurality of cells coupled in series, comprising:
a plurality of autonomous cell balancing circuits each electrically connected across one of the cells and including analog circuitry configured to increase a duty cycle of a transistor gate signal to enable a resistor to shunt excess current before overcharge occurs as a difference between a reference voltage and a detected voltage across the cell increases.

7. The system of claim 6, wherein each of the cell balancing circuits further comprises a temperature sensor coupled to the analog circuitry and wherein the analog circuitry is further configured to alter the duty cycle based on a temperature of the cell.

8. The system of claim 6 further comprising:
a plurality of battery monitor circuits each connected to a single output from at least one of the cell groups.

9. The system of claim 8, wherein each of the battery monitor circuits includes multiple channels and wherein each of the multiple channels is connected to one of the cell groups.

10. The system of claim 6, wherein the cell groups are connected in series, further comprising a microprocessor-based battery controller connected to the cell groups.

11. A system for controlling a vehicle, comprising:
a traction battery having a plurality of cell groups each having an associated plurality of cells connected in series;
an autonomous cell balancing circuit connected across each of the cells, each of the cell balancing circuits including analogy circuitry configured to increase a duty cycle of a transistor gate signal to enable a resistor to shunt excess current before overcharge occurs as a difference between a reference cell voltage and a measured voltage across the cell increases;
an interface circuit having inputs connected across an associated one of the cell groups and providing an output voltage in a range corresponding to a voltage range of a single one of the cells;
a battery monitor circuit coupled to each interface circuit; and
a battery controller coupled to the battery monitor circuit.

12. The system of claim 11, wherein each of the cell balancing circuits comprises a temperature sensor and wherein the analog circuitry is further configured to alter the duty cycle in response to a signal from the temperature sensor.

13. The system of claim 11, wherein the cell balancing circuits and the interface circuit are formed on a common integrated circuit substrate.

14. The system of claim 11, wherein the battery comprises a lithium-ion battery.

15. The system of claim 11, wherein the interface circuit comprises a voltage divider circuit.

* * * * *